United States Patent
Bright et al.

(10) Patent No.: US 6,523,110 B1
(45) Date of Patent: Feb. 18, 2003

(54) DECOUPLED FETCH-EXECUTE ENGINE WITH STATIC BRANCH PREDICTION SUPPORT

(75) Inventors: Arthur A. Bright, Croton-on-Hudson, NY (US); Jason E. Fritts, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,054

(22) Filed: Jul. 23, 1999

(51) Int. Cl.[7] .............................................. G06F 9/32
(52) U.S. Cl. ...................................... 712/239; 712/235
(58) Field of Search .............................. 712/239, 234, 712/207, 235

(56) References Cited

U.S. PATENT DOCUMENTS

| | | | | |
|---|---|---|---|---|
| 5,165,025 A | * | 11/1992 | Lass ............................ | 712/235 |
| 5,506,976 A | * | 4/1996 | Jaggar ......................... | 712/238 |
| 5,615,386 A | * | 3/1997 | Amerson et al. ............ | 712/238 |
| 5,664,135 A | * | 9/1997 | Schlansker et al. ......... | 712/201 |
| 5,732,243 A | * | 3/1998 | McMahan ................... | 711/137 |
| 5,850,543 A | * | 12/1998 | Shiell ......................... | 712/238 |
| 5,857,104 A | * | 1/1999 | Natarjan et al. ............ | 712/239 |
| 5,878,254 A | * | 3/1999 | Shimada ..................... | 712/238 |
| 5,889,986 A | * | 3/1999 | Nguyen ...................... | 712/237 |
| 5,948,100 A | * | 9/1999 | Hsu ........................... | 712/238 |
| 5,987,599 A | * | 11/1999 | Poplingher .................. | 712/238 |
| 6,044,459 A | * | 3/2000 | Bae ............................ | 712/237 |

* cited by examiner

Primary Examiner—Eric Coleman
(74) Attorney, Agent, or Firm—F. Chau & Associates, LLP

(57) ABSTRACT

There is provided a decoupled fetch-execute engine with static branch prediction support. A method for prefetching targets of branch instructions in a computer processing system having instruction fetch decoupled from an execution pipeline includes the step of generating a prepare-to-branch (PBR) operation. The PBR operation includes address bits corresponding to a branch paired thereto and address bits corresponding to an expected target of the branch. The execution of the PBR operation is scheduled prior to execution of the paired branch to enforce a desired latency therebetween. Upon execution of the PBR operation, it is determined whether the paired branch is available using the address bits of the PBR operation corresponding to the paired branch. When the paired branch is available, the expected branch target is fetched using the address bits of the PBR operation corresponding to the expected branch target.

35 Claims, 9 Drawing Sheets

DECOUPLED FETCH-EXECUTE ENGINE WITH STATIC BRANCH PREDICTION SUPPORT

BACKGROUND

1. Technical Field

The present invention relates generally to computer processing systems and, in particular, to a decoupled fetch-execute engine with static branch prediction support.

2. Background Description

Early microprocessors generally processed instructions one at a time. Each instruction was processed using four sequential stages: instruction fetch; instruction decode; instruction execute; and result writeback. Within such microprocessors, different dedicated logic blocks performed each different processing stage. Each logic block waited until all the preceding logic blocks completed operations before beginning its operation.

Improved computational speed has been obtained by increasing the speed with which the computer hardware operates and by introducing parallel processing in one form or another. "Superscalar" and "Very Long Instruction Word" (VLIW) microprocessors have been recently introduced to implement parallel processing. They have multiple execution units (e.g., multiple integer arithmetic logic units (ALUs)) for executing instructions and, thus, having multiple "pipelines". As such, multiple machine instructions may be executed simultaneously in a superscalar or VLIW microprocessor, providing obvious benefits in the overall performance of the device and its system application.

For the purposes of this discussion, latency is defined as the delay between the fetch stage of an instruction and the execution stage of the instruction. Consider an instruction which references data stored in a specified register. Such an instruction requires at least four machine cycles to complete. In the first cycle, the instruction is fetched from memory. In the second cycle, the instruction is decoded. In the third cycle, the instruction is executed and, in the fourth cycle, data is written back to the appropriate location.

To improve efficiency and reduce instruction latency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock pulse the result of each processing stage is passed to the subsequent processing stage. Microprocessors that use the technique of overlapping the fetch, decode, execute, and writeback stages are known as "pipelined" microprocessors. In principle, a pipelined microprocessor can complete the execution of one instruction per machine cycle when a known sequence of instructions is being executed. Thus, it is evident that the effects of the latency time are reduced in pipelined microprocessors by initiating the processing of a second instruction before the actual execution of the first instruction is completed.

Unfortunately, various scenarios may exist where a stall is induced in a pipelined microprocessor. One such scenario is the branch instruction. In general, the instruction flow in a microprocessor requires that instructions are fetched and decoded from sequential locations in memory. A branch instruction is an instruction that causes a disruption in this flow, e.g., a taken branch causes decoding to be discontinued along the sequential path, and resumed at a new location in memory. The new location in memory may be referred to as a target address of the branch. Such an interruption in pipelined instruction flow results in a substantial degradation in pipeline performance.

As architecture and compiler designers continue to strive for greater degrees of parallelism, the effect of pipeline stall penalties on parallelism becomes very significant. For high levels of parallelism, the average number of cycles spent executing an instruction (CPI) must be much less than 1. Such a small CPI is only possible by minimizing the CPI penalties from stalls, thereby reducing their impact upon pipeline throughput. The problem of reducing stall penalties is aggravated by the potentially greater frequency of stalls due to higher instruction issue rates. It becomes necessary to find more capable methods for decreasing these penalties. Two common methods for reducing stall penalties include decoupled architectures and branch prediction.

Decoupled architectures use buffering and control mechanisms to dissociate memory accesses from the rest of the pipeline. When a cache miss occurs, the decoupled architecture allows the rest of the pipeline to continue moving forward, only stalling those instructions dependent upon that cache access. Decoupling of cache accesses from the pipeline can be used with either instruction or data caches. Decoupling of the instruction cache from the execute pipeline, hereafter referred to as decoupled fetch-execute, is beneficial for both superscalar and EPIC/VLIW (Very Long Instruction Word) architectures. The EPIC architecture is further described by L. Gwennap, in "Intel, HP make EPIC disclosure", Microprocessor Report, 11(14): Oct. 1–9, 1997.

Decoupled fetch-execute architectures use instruction buffers and branch prediction to enable instruction fetching to be independent from the rest of the pipeline. The instruction buffers are organized as a queue that receives instructions as they are fetched from the instruction cache. As instructions enter the queue, a branch prediction mechanism checks for the existence of a branch instruction. When a branch is found, the branch prediction mechanism predicts the likely branch target (address) and direction. If necessary, the branch prediction mechanism redirects the instruction fetch to the predicted address.

Most general-purpose processors today use dynamic branch prediction mechanisms, which select at execution time the direction a branch is expected to take. Dynamic branch prediction mechanisms can include tables of prediction counters, history tables, and branch target buffers. Many of these schemes add considerable hardware, and may affect the processor frequency. Dynamic branch prediction schemes are described by: Calder et al., in "A System Level Perspective on Branch Architecture Performance", Proceedings of the 16$^{th}$ Annual International Symposium on Computer Architecture, pp. 199–206, May 1989; and Chang et al., in "Comparing software and hardware schemes for reducing the cost of branches", Proceedings of the 16$^{th}$ Annual International Symposium on Computer Architecture, pp. 224–233, May 1989.

Static branch prediction provides an alternate prediction method, as it corresponds to selecting at compile time the direction a branch is expected to take. Static branch prediction does not perform as well as dynamic branch prediction for most general-purpose applications, but does do well in some application markets, so architectures for these markets may be able to forego the cost of dynamic branch prediction. Such markets include media processing and binary translation in software, which performs run-time compilation using dynamic profile statistics, enabling accurate static branch prediction. Media processing is further described by Fritts et al., in "Understanding multimedia application characteristics for designing programmable media processors", SPIE Photonics West, Media Processors '99, San Jose, Calif., January 1999. Binary translation in software is described by Altman et al., in "Execution-based Scheduling for VLIW Architectures", submitted to Euro-Par '99, Toulouse, France, September 1999.

In static branch prediction, conditional branches that are predicted as not taken, i.e. those expected to fall through to the sequential path, are easily supported since instruction fetch logic automatically continues sequentially. Unconditional branches and conditional branches that are predicted as taken, i.e. those expected to continue execution at a non-sequential target instruction, require support for redirecting the instruction fetch unit to begin prefetching the expected branch target prior to execution of the branch. It is desired that this prefetching begin immediately after the fetch of the branch instruction to enable execution of the expected branch target right after the branch executes.

One method for accomplishing this uses a prediction bit in the branch operation. After fetching the branch operation, the expected branch target address is sent to the instruction fetch unit if the prediction bit indicates taken. A problem with this method is that determination of the prediction direction and target address requires access to the contents of the branch operation. The expected branch target can only be fetched once the branch operation is returned by the instruction cache, the direction set by the prediction bit is determined, and the expected branch target address has been computed. FIG. 1 is a diagram illustrating the timing in fetching the predicted branch target. Option 1 corresponds to the desired timing for fetching the predicted branch target, which is right after beginning fetch of the branch operation. Option 2 corresponds to the actual fetch timing, which is delayed due to the need for the contents of the branch operation. As shown, in an instruction cache with f stages, the earliest the contents of the branch operation become available is f cycles after the fetch was initiated. However, the desired time to begin fetching the expected branch target is only 1 cycle after the branch begins being fetched. Consequently, the use of a prediction bit for performing static branch prediction will usually not allow ideal timing for fetching the predicted branch target, but will insert at least f–1 delay cycles between the branch and predicted target.

An alternative technique is to issue a fetch hint operation (referred to hereinafter as a "prepare-to-branch (PBR)" operation) for the expected branch target. The PBR operation typically has one main field that indicates the address or displacement of the predicted branch target. Additional fields may include a register destination for the address of the expected branch target, or a predicate condition which indicates whether to execute the PBR operation. Such a predicate is particularly useful for implementing more intelligent static branch prediction methods, such as branch correlation. Performing static branch correlation without using predication can require substantial code duplication. A discussion of branch correlation is provided by: Smith et al., in "Improving the accuracy of static branch prediction using branch correlation", Proceedings of the 6th Annual International Conference on Architectural Support for Programming Languages and Operating Systems, October 1994; and Gloy et al., in "Performance issues in correlated branch prediction schemes", Proceedings of the 28th Annual International Symposium on Microarchitecture, Ann Arbor, Mich., pp. 3–14, November 1995.

A critical aspect of the prepare-to-branch operation is timing. The PBR operation should be scheduled to begin fetching the expected branch target immediately after initiating fetching the corresponding branch operation, as indicated by option 1 in FIG. 1. The PBR operation cannot redirect fetching earlier as that will prevent the branch operation from being fetched. Also, the PBR operation should not redirect fetching later to avoid extra delay between the branch and the predicted target. Achieving this timing requires two mechanisms. First, a mechanism is necessary for associating the PBR operation with the branch it is predicting. This association is hereafter referred to as "pairing", and the corresponding branch is called the "paired branch". Second, a mechanism is necessary for recognizing that fetching of the paired branch has started and that fetching of the expected branch target may begin.

There are two principal approaches for implementing the prepare-to-branch operation. The first approach is commonly used in in-order lock-step pipelines. A lock-step pipeline is a pipeline in which all stages of the pipeline advance together. If any one pipeline stage cannot advance (for whatever reason), then none of the pipeline stages advance (i.e., all stages either "step" together, or "lock" together). The first approach is to schedule the PBR operation a fixed number of instructions before the branch. The fixed-position of the branch with respect to the PBR operation serves both as the means for uniquely defining the paired branch as well as indicating when fetching of the expected branch target begins. The dependent nature of all pipeline stages in a lock-step pipeline ensures correct fetch timing in the fixed-position method. However, the fixed-position timing model is only effective on lock-step pipelines and cannot be used in decoupled fetch-execute architectures, which eliminate the dependency between the execution pipeline and instruction fetch pipeline. This approach is described in further detail by Patterson et al., in "RISC I: A Reduced Instruction Set VLSI Computer", Proceedings of the 8th Annual Symposium on Computer Architecture, April 1981.

The second approach for implementing the prepare-to-branch operation uses a register in the PBR operation for pairing with the branch operation. The branch operation uses the same register to provide its target address. The register name provides a means for pairing without necessitating a fixed position for the PBR operation, and allows greater scheduling freedom. Implementing timing for this technique requires first determining if the branch operation is available before starting the fetching of the predicted branch target. Availability of the branch operation can be determined by searching the newly fetched instructions, the instruction buffers, and the pipeline, for a branch operation using the same register as the PBR operation. Once the paired branch is found, fetching of the expected branch target may begin. Like the prediction bit scheme, this scheme also requires access to the contents of the branch operation before enabling the fetching of the expected branch target, so it too forces a minimum delay of f–1 cycles between the fetching of the branch and its predicted target. This scheme is described in further detail in the following: Kathail et al., "HPL PlayDoh Architecture Specification: Version 1.0", HPL-93-80, February 1994.

An alternative approach for pairing is to indicate the number of instructions after the PBR operation that the paired branch occurs. However, this approach is expected to require greater complexity for decoupled fetch-execute pipelines, particularly for implementations in explicitly parallel architectures with compressed instruction formats, where the size of an instruction is unknown prior to decoding. For an article describing this approach, see Goodman et al., "A simulation study of architectural data queues and prepare-to-branch instruction", Proceedings of the IEEE International Conference on Computer Design '84, Port Chester, N.Y., 1984, pp. 544–549.

Despite the existence of numerous static branch prediction schemes, the majority of such schemes have been designed for lock-step pipelines and thus, do not adapt well to decoupled fetch-execute architectures.

Accordingly, it would be desirable and highly advantageous to have a method and apparatus for supporting static branch prediction on a decoupled fetch-execute pipeline.

SUMMARY OF THE INVENTION

The present invention is directed to a decoupled fetch-execute engine with static branch prediction support. The present invention allows the predicted branch target of a branch instruction to be fetched immediately after fetching the branch instruction. Contrary to existing static branch prediction methods, the contents of the branch operation are not required prior to fetching the predicted branch target.

According to a first aspect of the present invention, a method for prefetching targets of branch instructions in a computer processing system having instruction fetch decoupled from an execution pipeline includes the step of generating a prepare-to-branch (PBR) operation. The PBR operation includes address bits corresponding to a branch paired thereto and address bits corresponding to an expected target of the branch. The execution of the PBR operation is scheduled prior to execution of the paired branch to enforce a desired latency therebetween. Upon execution of the PBR operation, it is determined whether the paired branch is available using the address bits of the PBR operation corresponding to the paired branch. When the paired branch is available, the expected branch target is fetched using the address bits of the PBR operation corresponding to the expected branch target.

According to a second aspect of the present invention, the method further includes the steps of decoding the paired branch. When a misprediction is detected, all operations following the paired branch are invalidated and the correct target of the paired branch is fetched.

According to a third aspect of the present invention, the step of fetching the correct target includes the step of fetching an instruction immediately following the paired branch, when the paired branch is mispredicted taken.

According to a fourth aspect of the present invention, the step of fetching the correct target includes the step of fetching an instruction corresponding to the target address specified in the paired branch, when the paired branch is mispredicted not taken.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a decoupled fetch-execute engine with static branch prediction support. The present invention allows the predicted branch target of a branch instruction to be fetched immediately after fetching the branch instruction. Moreover, unlike existing static branch prediction methods, the contents of the branch operation are not required prior to fetching the predicted branch target.

To facilitate a clear understanding of the present invention, definitions of terms employed herein will now be given. "Static branch prediction" refers to selecting (predicting) at compile time the direction a branch is expected to take. "Decoupled fetch-execute" (also commonly known as "decoupled access-execute") refers to the decoupling of the instruction cache from the execute pipeline in a pipelined computer processing system. A "prepare-to-branch" (PBR) operation is an instruction scheduled ahead of a branch that redirects instruction fetch to the expected target of that branch, prior to actual execution of the branch. "Pairing" refers to the association between a prepare-to-branch operation and the branch it is predicting, the branch being referred to as a "paired branch". "Mispredicted taken" refers to a branch predicted as taken (and which used a PBR operation to redirect instruction flow accordingly), but is actually not taken. "Mispredicted not taken" refers to a branch predicted as not taken, but is actually taken.

A general description of the present invention will now be provided to introduce the reader to the concepts of the invention. Subsequently, more detailed descriptions of various aspects of the invention will be provided.

The present invention corresponds to a method for static branch prediction using the prepare-to-branch (PBR) method. The present invention adds a field in the PBR operation specifying the last few address bits of the corresponding branch operation. Use of the branch operation's address defines a method for pairing the two operations without requiring access to the contents of the branch operation. It is therefore possible to determine whether the paired branch operation is in the process of being fetched before the branch is even available. This enables the architecture to start fetching the predicted branch target immediately after fetch begins for the paired branch.

Figure 1:
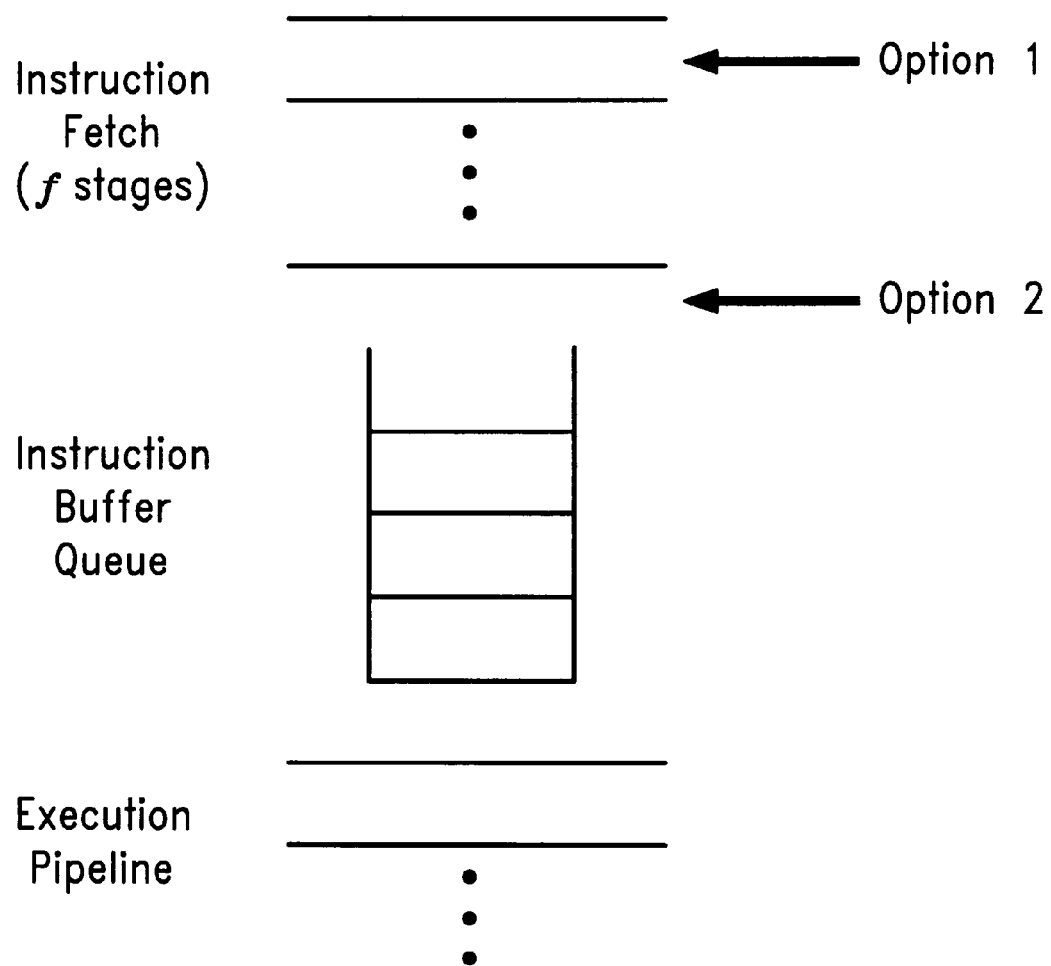
FIG. 1 is a diagram illustrating the timing in fetching the predicted branch target of a branch instruction.
Figure 2:
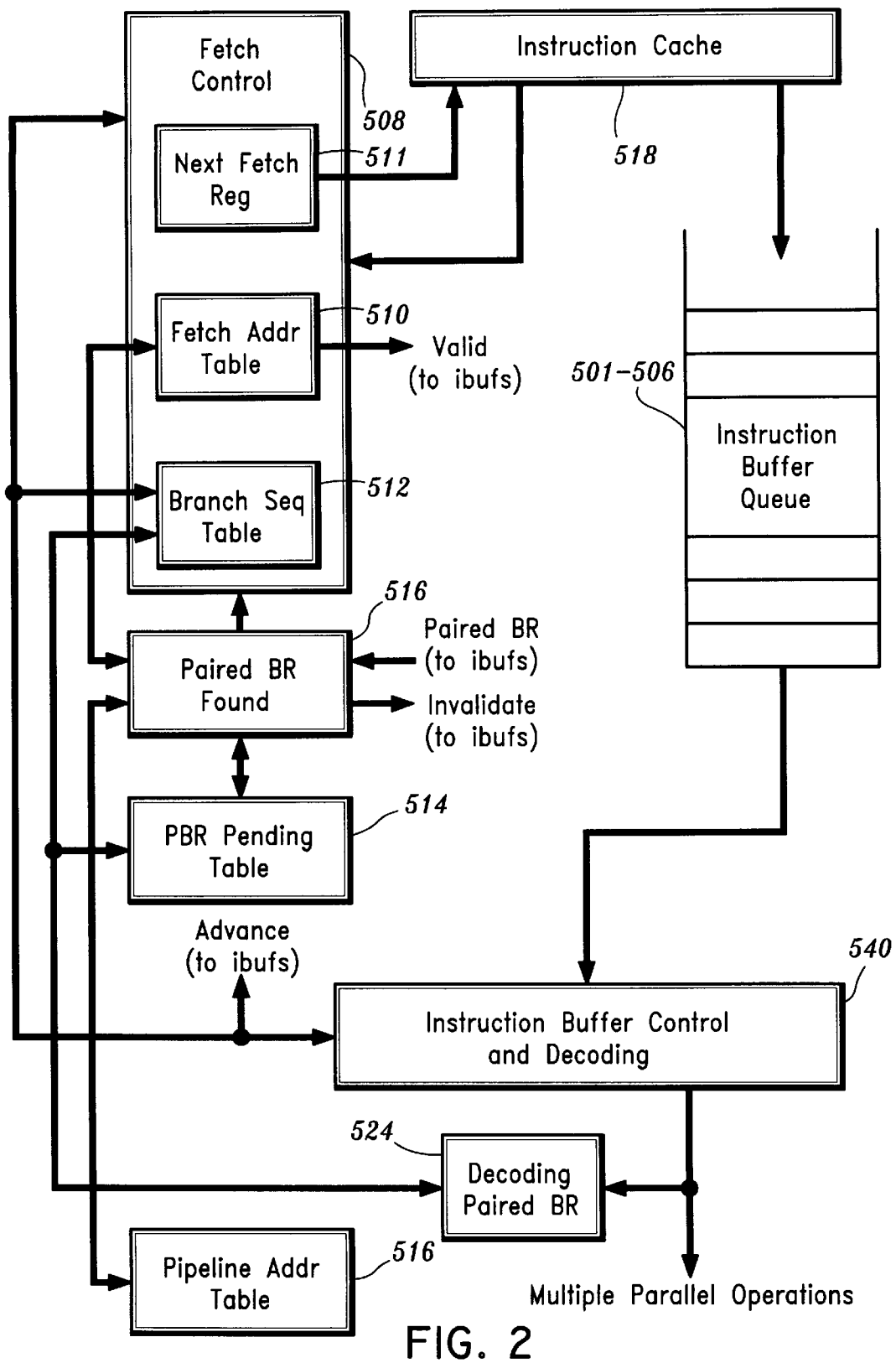
FIG. 2 is a diagram of a decoupled fetch-execute architecture for supporting static branch prediction according to an embodiment of the present invention.

FIG. 2 is a diagram of a decoupled fetch-execute architecture for supporting static branch prediction according to an embodiment of the present invention. This architecture embodies a typical instruction buffer architecture with a few additions to guarantee proper support and fetch timing for the prepare-to-branch operation. The design assumes a queue of six instruction buffers, 501–506.

A fetch control unit 508 includes a fetch address table 510, a next fetch register 511, and a branch sequential table 512. The fetch control unit 508 uses the fetch address table 510 and the next fetch register 511 to keep track of all outstanding instruction fetches and the next fetch request, respectively. The branch sequential table 512 stores the addresses of the next sequential instruction after every paired branch.

A PBR pending table 514 maintains a listing of pending PBR operations. A paired branch found circuit 516 is used to search for the paired branch operation and invalidate all operations following the branch. It works in conjunction with a pipeline address table 516, a fetch address table 510, and instruction buffer addresses to search in the execution pipeline, an instruction cache 518, and the instruction buffers 501–506, respectively. The decoding paired branch circuit 524 is used for checking for the existence of the paired branch, and determining whether to store the next sequential instruction address in the branch sequential table 512. An instruction buffer control and decoding circuit 540 controls operation of the queue of instruction buffers and decodes the next group of parallel operations to be issued. Each of these units will be discussed in more detail below.

Figure 3:
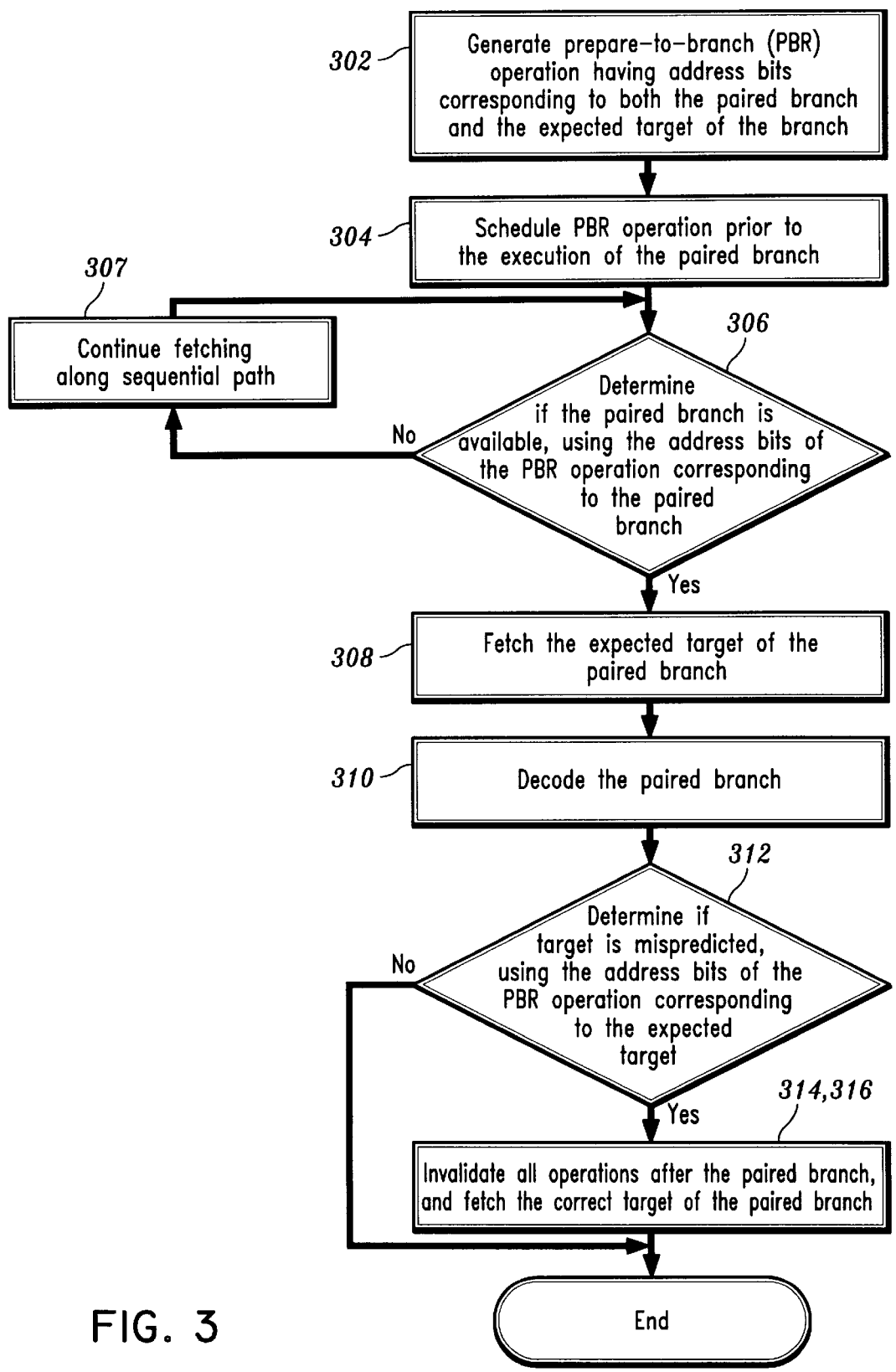
FIG. 3 is a flow chart of a method for prefetching targets of branch instructions in a computer processing system having instruction fetch decoupled from an execution pipeline.

FIG. 3 is a flow chart of a method for prefetching targets of branch instructions in a computer processing system having instruction fetch decoupled from an execution pipeline. Accordingly, the method of FIG. 3 may be implemented using the decoupled fetch-execute architecture of FIG. 2.

A prepare-to-branch (PBR) operation is generated which includes address bits corresponding to a branch paired thereto and address bits corresponding to an expected target of the branch (step 302). The execution of the PBR operation is scheduled prior to the execution of the paired branch to enforce a desired latency therebetween (step 304).

Upon execution of the PBR operation, it is determined whether or not the paired branch is available using the address bits of the PBR operation corresponding to the paired branch (step 306). When the paired branch is not available, fetching continues along the sequential path (step 307).

When the paired branch is available, the expected branch target is fetched using the address bits of the PBR operation corresponding to the expected branch target (step 308). Next, when the paired branch reaches the head of the instruction buffer queue, it is decoded and sent to the execution pipeline (step 310).

During execution, it is determined if the target of the paired branch has been mispredicted (step 312). If so, all operations after the paired branch instruction are invalidated (step 314), and the correct branch target of the paired branch instruction is fetched (step 316). When the paired branch instruction is mispredicted taken, the correct branch target corresponds to the instruction immediately following the paired branch target. When the paired branch instruction is mispredicted not taken, the correct branch target is provided in the paired branch instruction. Preferably, steps 302 and 304 are performed at compile time, and steps 306 through 316 are performed at run time.

Figure 4:
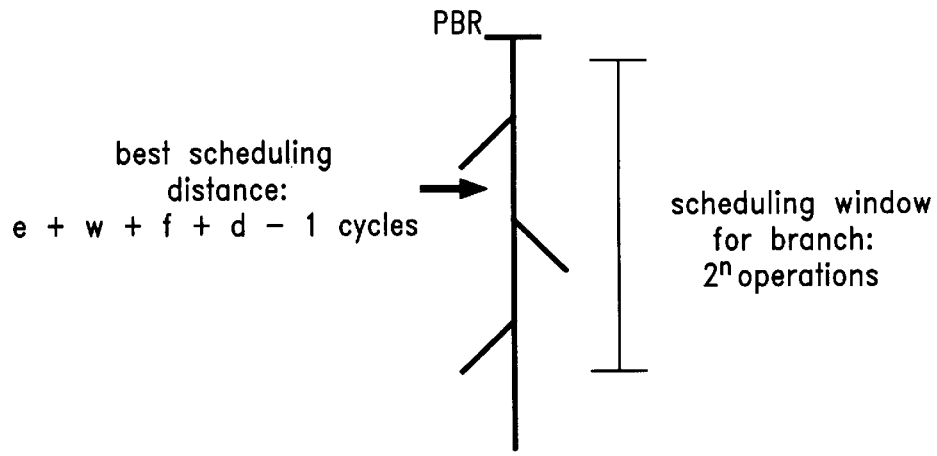
FIG. 4 is a diagram illustrating the scheduling of a PBR operation with respect to its paired branch.

A description of the prepare-to-branch operation will now be given. The prepare-to-branch operation should meet two requirements. First, it should contain a field which, in turn, contains the last few address bits of its paired branch. This address may either be to the paired branch operation itself, or to a group of operations which contains only one branch. Typically, 3–5 bits will be sufficient for the size of this field. Using the last few address bits of the paired branch defines a scheduling window following the PBR operation in which the paired branch should be scheduled. Each branch in the program has an associated static prediction value, which combined defines a predicted path of execution for the program. FIG. 4 is a diagram illustrating the scheduling of a PBR operation with respect to its paired branch. In particular, FIG. 4 illustrates a straight-line view of a predicted path, with branches predicted "not taken" shown as potential side exits from this path. The PBR operation and paired branch should both be scheduled on this predicted path, with the allowable distance between them defined by the size of the scheduling window. Assuming n least significant bits of the paired branch address are used, a scheduling window of $2^n$ operations is defined, over which the paired branch may be uniquely identified. Using this n bit address, the paired branch is identified as the first branch occurring along the predicted path with the same least significant address bits.

Figure 5:
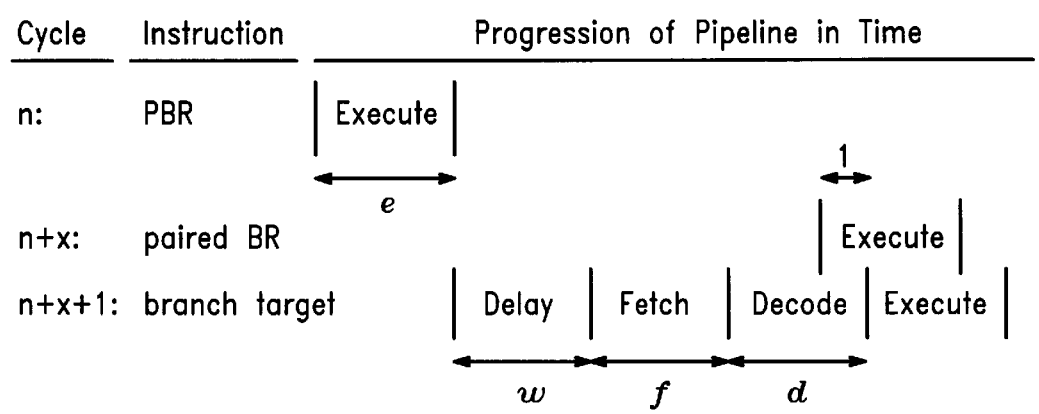
FIG. 5 is a diagram illustrating the optimum latency between a prepare-to-branch operation and its paired branch.

Second, the PBR operation should be scheduled a certain number of cycles prior to the paired branch to enable the best timing for fetching the expected branch target. The PBR operation may be scheduled closer or farther from the paired branch than this desired number of cycles, but best performance will be achieved with this latency. This desired latency is defined by the processor implementation. Assuming an implementation with e execute stages for the PBR operation, a wire delay of w cycles, f instruction fetch stages, and d decode and register fetch stages, the distance, in the absence of stalls, is e+w+f+d−1 cycles, as shown in FIG. 5, which is a diagram illustrating the optimum latency between a prepare-to-branch operation and its paired branch. This optimum latency between the PBR operation and paired branch is also shown in the scheduling window in FIG. 4. It is to be appreciated that the above distance is desirable, but not necessary. Note that current processors typically have 1–2 fetches stages, 1 PBR execute stage, 2–3 decode stages, and 0 cycles for wire delay, achieving a latency of 3–5 cycles. However, as clock frequencies continue to increase, wire delay becomes more prominent, and this latency is expected to increase to 5–7 cycles.

Scheduling for this latency depends upon the type of architecture being used. In explicitly parallel architectures, only one parallel instruction may be issued per cycle, so the latency can be achieved by scheduling the PBR operation the necessary number of parallel instructions before the paired branch. In superscalar processors, instructions may be reordered at run-time so it can be difficult to predict the latency between the execution times of any two instructions. However, the latency can be assured by scheduling the PBR operation early enough such that the dependency chains and/or resource dependencies of all operations between the PBR and branch operation enforce the desired latency between the PBR operation and paired branch.

The above step of determining whether the paired branch is available will now be described more fully. When a prepare-to-branch operation occurs, it is necessary to determine whether or not the paired branch operation is available before redirecting instruction fetch to the expected branch target. Depending upon when the paired branch was scheduled with respect to the PBR operation, and whether any stalls have occurred, the processing of the paired branch operation may be in a number of possible stages, including:

in the execution pipeline; in the instruction buffers; being fetched by the instruction cache; and not yet being fetched.

Accordingly, the process of determining the location of a paired branch requires a means to search for the paired branch in each pipeline stage (prior to the PBR execute stage), instruction buffer, and instruction cache fetch stage. Furthermore, since only a few of the least significant address bits of the paired branch are being used, enough information must be available to determine which instruction is the actual paired branch, in the event that multiple matches are found. Once the location of the paired branch is determined, the appropriate actions must be taken.

If the paired branch is in any of the first three locations, then the paired branch operation is available and the fetch of the expected branch target may begin. However, additional sequential operations following the paired branch may also be available in the pipeline, instruction buffers, and instruction cache. As instruction fetch is being redirected by the PBR operation, all sequential operations after the paired branch in the pipeline, instruction buffers, and instruction cache must be squashed. In the case of the instruction cache, this requires some mechanism to invalidate the offending sequential operations after they have been fetched.

If the paired branch is not yet being fetched, then the paired branch is not available and the PBR operation must wait until the fetch request for the paired branch has been issued. Only after the instruction cache begins fetching at the address of the paired branch may the PBR operation redirect the fetch unit to fetch the expected branch target. While waiting, the PBR operation and all information associated with it must be held in a state register.

A general description of the support for mispredicted branches will now be given. Like the prepare-to-branch operation, occurrence of a mispredicted branch must also redirect instruction fetch and invalidate all operations in the pipeline. However, there is no need to search or wait for a paired branch. A misprediction simply invalidates all instruction buffers, all instruction cache accesses, and all sequential operations after the mispredicted branch in the execution pipeline, and immediately redirects fetch to the correct branch target. Again, in the case of the instruction cache, it will be necessary to invalidate the fetched instructions after they have been fetched.

For mispredicted branches, two types of misprediction can occur. The first type involves a branch that was predicted not taken, but was actually taken. In this case, the address of the actual branch target is specified in the branch operation, so it can be provided to the fetch unit for fetching the correct branch target. The second type of misprediction involves a branch that was predicted taken, but was actually not taken. In this case, the address of the actual branch target is not specified in the branch operation, but is the address of the operation sequentially following the branch. Obtaining the address for fetching the correct branch target in this case requires either: a) generating the sequential address of the correct branch target from the mispredicted branch address, or b) storing the sequential branch target address in a state register after the branch operation is decoded earlier in the pipeline. While the former option seems like the better method, the latter approach may be more efficient for explicitly parallel architectures that use a compressed instruction format, as will be shown hereinbelow.

A general description of the fetch control unit will now be given. The fetch control unit directs the instruction cache when to perform an instruction fetch and from what location. Essentially, the fetch unit arbitrates between the various events which request instruction fetches and then issues the appropriate fetch requests to the instruction cache when it is not busy. There are five events that can request an instruction. Listed in order of increasing priority, they are: (1) instruction buffers request sequential instruction fetch; (2) prepare-to-branch operation requests expected branch target; (3) branch predicted not taken is mispredicted and requests non-sequential branch target; (4) branch predicted taken is mispredicted and requests sequential branch target; and (5) exception or reset requests exception handler.

The most common and lowest priority event is the request for a sequential instruction fetch. In this case, the instruction buffers have emptied to the point that they can accept more instruction data and so request the next group of sequential instructions.

When implementing fetch control, if the instruction cache is busy when a fetch request occurs, then the fetch request must be stored in a state register which indicates the instruction address for the next fetch. If multiple fetch requests are logged to this register before the instruction cache becomes available, then only the highest priority fetch request needs to be saved.

A general description of the instruction buffers will now be given. The purpose of the instruction buffers is to decouple instruction fetch from the execution pipeline. The number of instruction buffers necessary for accomplishing this is dependent upon the architecture. The instruction buffers are arranged as a queue. Any implementation of the queue should support standard queue attributes, advancing the queue whenever the head of the queue empties, and writing instruction cache data only to the first empty instruction buffer at the tail of the queue.

With respect to the static branch prediction method described herein, the instruction buffer queue's responsibility is to issue a fetch request for the next sequential group of instructions when a sufficient number of entries becomes available. The amount of room necessary before a fetch request is made must also account for the space required for any currently outstanding fetch requests. For example, in a 2-cycle instruction cache, up to two instruction fetches may currently be outstanding in the cache, so a request should only be made if at least three buffers are empty.

An implementation of the static branch prediction method of the present invention will now be given. It is to be appreciated that the following implementation may be readily modified by one skilled in the art to correspond to various architectures of computer processing systems.

The static branch prediction method of the present invention was implemented on an Explicitly Parallel Instruction Computing (EPIC) architecture. The architecture explicitly describes the instructions that are to be issued in parallel as a single long instruction word. The parallel instructions are defined by a compressed instruction format, which uses stop bits after every operation to delineate the parallel operations. A stop bit asserted by an operation indicates that all the instructions between it and the previous operation with an asserted stop bit are to execute in parallel. To allow additional space in the operation format both for the stop bit and predication, three operations are packed into a "bundle" of 128 bits, instead of only 32 bits per operation. This architecture is similar to the IA-64 instruction set announced by Intel in 1997 as the basis for their forthcoming Merced processor. The IA-64 instruction set is described in the above referenced article entitled "Intel, HP make EPIC disclosure".

Our implementation assumes an EPIC architecture capable of issuing a long instruction of up to six operations per cycle. Each group of explicitly parallel instructions is referred to as a "package", and each package may contain between zero and six operations, where the case of zero instructions is defined as a null operation (NOP) followed by a stop bit.

For simplicity in the initial implementation, a limitation was placed upon which operations could be used as branch targets. Defining a pair of bundles aligned on a 32-byte boundary as a "double-bundle", branching to non-sequential targets is only allowed to the beginning of a double-bundle. This restriction is not a necessary condition for the static branch prediction method, or even this implementation. Branching to the beginning of every bundle could easily be allowed with only minor logic changes.

One interesting aspect of the EPIC instruction format with respect to this implementation is that not all operations are directly addressable by memory addresses. Instead the address of an operation is characterized by the address of its bundle and its position (either position 0, 1, or 2) within the bundle. Therefore, correlating the PBR operation and the branch operation via the last few bits of the branch operation will not work. Instead, only the address of the double-bundle containing the paired branch is used for this correlation, with the restriction that only one paired branch operation be placed in a double-bundle. Again, this restriction could be relaxed to restrict the number of paired branches to one per bundle (instead of one per double-bundle), with a minimum of extra logic.

Figure 6:
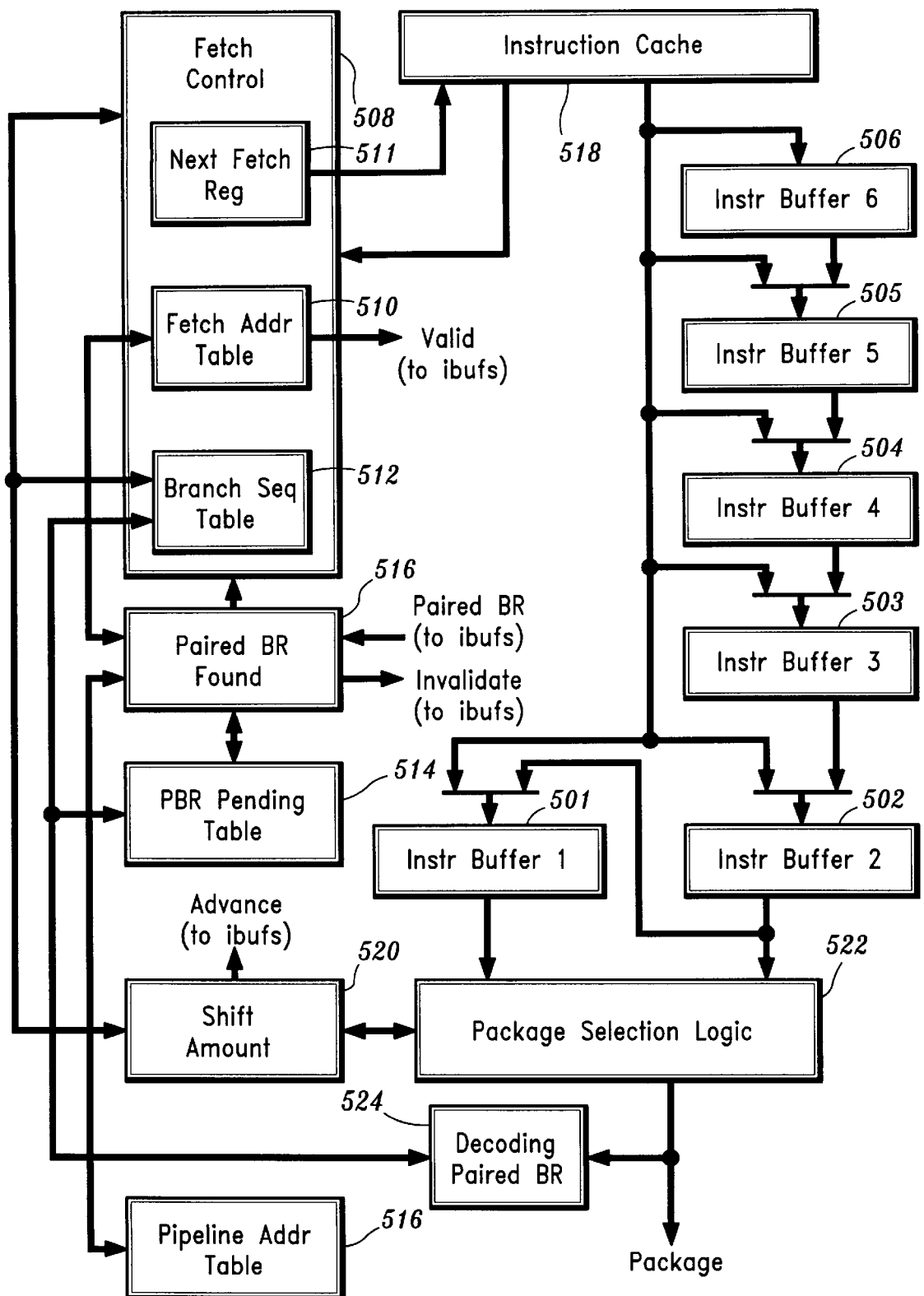
FIG. 6 is a diagram of a decoupled fetch-execute architecture for supporting static branch prediction according to another embodiment of the present invention.

FIG. 6 is a diagram of a decoupled fetch-execute architecture for supporting static branch prediction according to another embodiment of the present invention. This architecture embodies a typical instruction buffer architecture with a few additions to guarantee proper support and fetch timing for the prepare-to-branch operation. The design assumes a queue of six instruction buffers, 501–506, each containing a double-bundle of six operations. The fetch control unit 508 uses a fetch address table 510 and next fetch register 511 to keep track of all outstanding instruction fetches and the next fetch request, respectively. The branch sequential table 512 stores the addresses of the next sequential package after every paired branch. The PBR pending table 514 maintains a listing of pending PBR operations, and the paired branch found circuit 516 is used to search for the paired branch operation and invalidate all sequential operations following the branch. It works in conjunction with the pipeline address table 516, fetch address table 510, and instruction buffer addresses to search in the execution pipeline, instruction cache 518, and instruction buffers 501–506, respectively. Finally, the shift amount control circuit 520 and package selection logic circuit 522 are circuits specific to EPIC architectures for extracting the next package from the first two instruction buffers 501, 502. The decoding paired branch circuit 524 is required for checking for the existence of the paired branch in the package currently being decoded, and determining whether to store the next sequential package address in the branch sequential table 512. Each of these units will be discussed in more detail below.

Figure 7:
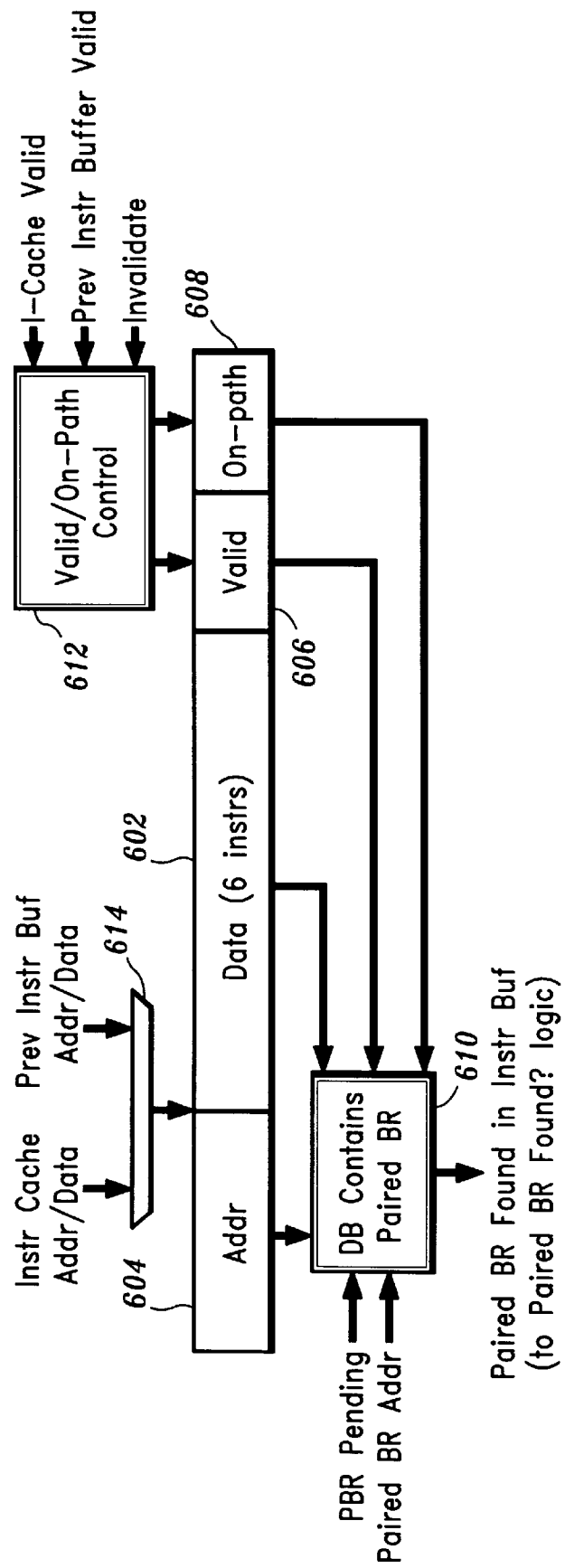
FIG. 7 is a diagram illustrating the fields contained in the instruction buffers of FIG. 6 according to an embodiment of the present invention.

FIG. 7 is a diagram illustrating the fields contained in each of the instruction buffers 501–506 of FIG. 6 according to an embodiment of the present invention. The four fields are: a data field 602 corresponding to the contents of a double-bundle; an address field 604 corresponding to the address of that double-bundle; a valid field 606 corresponding to a valid bit 606a; and an "on-path" field 608 corresponding to an "on-path" bit 608a. To maintain proper queue implementation, the instruction buffer is organized as a FIFO.

A DB (double-bundle) contains paired branch circuit 610 compares the least significant n bits of the paired branch address for a pending PBR operation against a second double-bundle address supplied by the fetch address table 510 or instruction buffer queue 501–506. If the second address corresponds with a valid entry in the table 510 or queue 501–506, then it indicates that the double-bundle containing the paired branch has been found.

The on-path bit 608a indicates that a previous pending PBR operation checked this double-bundle for a paired branch and found its paired branch later in the instruction buffer or instruction cache, so this double-bundle lies on the correct path of execution. Consequently, when the on-path bit 608a is set (it is initially reset when fetch is initiated in the instruction cache), the search for a paired branch will always return negative. This ensures that multiple matches will not be found for the paired branch operation.

The valid bit 606a indicates if the current contents are valid. A valid/on-path control circuit 612 generates the valid and on-path bits for each instruction buffer entry according to incoming data from the instruction cache or previous instruction buffer, and according to changes in the state of the entry's status. A 2:1 multiplexer 614 multiplexes addresses and data provided from the instruction cache 518 and the previous instruction buffer for input to the current instruction buffer (in the queue).

Figure 8:
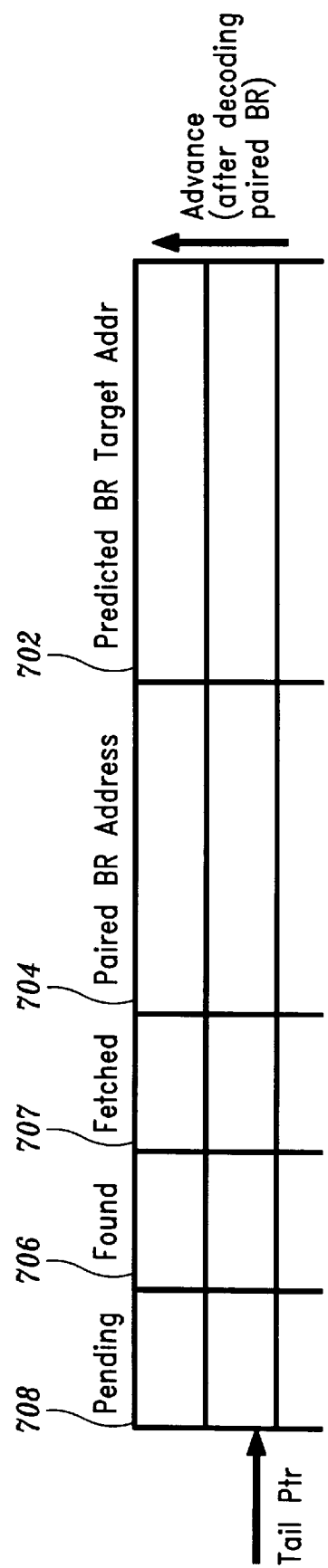
FIG. 8 is a diagram illustrating the fields contained in the PBR pending table of FIG. 6 according to an embodiment of the present invention.

The PBR pending table 514 implements a queue that maintains the status of all pending prepare-to-branch operations. FIG. 8 is a diagram illustrating the fields contained in the PBR pending table 514 of FIG. 6 according to an embodiment of the present invention. The fields are: a predicted BR target address field 702; a paired BR address field 704; a "found" field 706 corresponding to a "found" bit 706a; a "fetched" field 707 corresponding to a "fetched" bit 707a; and a "pending" field 708 corresponding to a "pending" bit 708a.

The predicted BR target address field 702 and the paired BR address field 704 contain the address of the expected branch target and the last few bits of the address of the double-bundle containing the paired branch, respectively. The found field 706, the fetched field 707, and the pending field 708 each contain a bit indicating the status of the pending PBRs. The first status bit, i.e., the pending bit 708a, is set when a PBR operation executes and is then added to the PBR pending table 514. The bit 708a remains set until the paired branch leaves the instruction buffers via the package selection logic 522, and is recognized by the decoding paired branch 524, which clears the pending bit 708a, advances the PBR pending table 514, and writes the next sequential package address to the branch sequential table 512.

As mentioned above, a pending PBR operation may be in one of three states. It is either searching for its paired branch operation, has found the paired branch but has not yet issued the fetch for the expected branch target, or has found the paired branch and has issued the fetch. These states are indicated by the found bit 706a corresponding to the found field 706, and the fetched bit 707a corresponding to the fetched field 707. The found bit 706a and fetched bit 707a are both reset when a new PBR operation executes and is added to the PBR pending table 514. While the found bit 706a is deasserted, the pending PBR sends the address of its paired branch to the paired branch found circuit 516, which searches the pipeline, instruction buffers 501–506, and instruction cache 518 each cycle until the paired branch is found. Once found, the found bit 706a is asserted, and the paired branch found circuit 516 invalidates any sequential operations following the paired branch, sets the on-path bit 608a in the remaining valid operations prior to and including the paired branch, and may issue a fetch request for the expected branch target to the fetch control unit 508. If the instruction cache 518 cannot immediately accept new fetch requests, the PBR operation attempts to make new fetch requests in each cycle thereafter until the fetch control unit 508 is able to accept new requests. When the request is accepted, the fetched bit 707a is asserted.

The PBR pending table 514 is organized as a queue to avoid incorrectly searching for paired branch operations. The predicted direction of the branches defines a predicted path of execution. PBR operations must occur in the same order as their paired branches so that each PBR operation will only search for its paired branch in the appropriate section of the predicted path. The queue arrangement accommodates this requirement, handling PBR operations one at a time so paired branches are searched for in order, ignoring operations already recognized as on-path.

Figure 9:
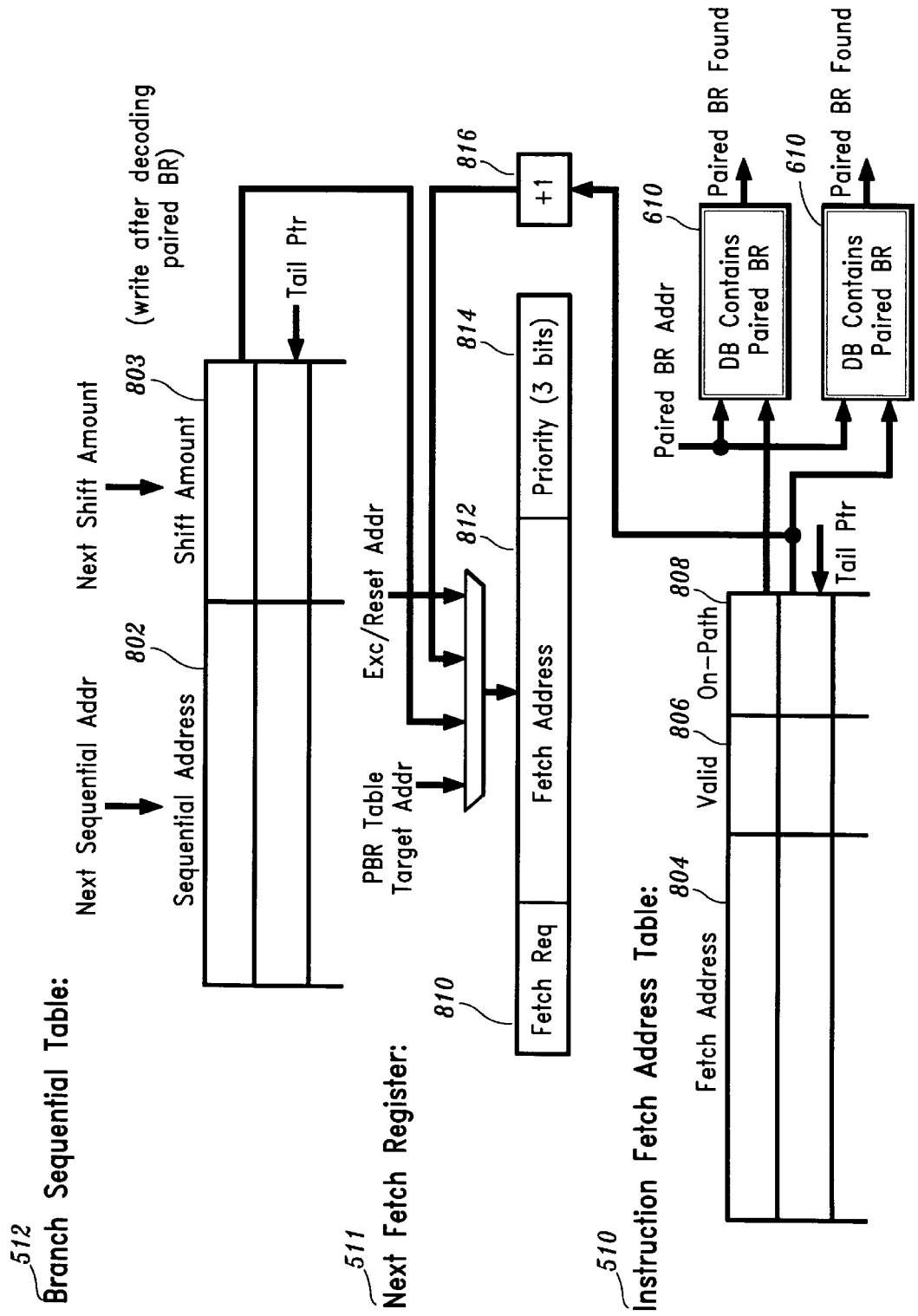
FIG. 9 is a diagram illustrating the fetch control unit 508 of FIG. 6.

FIG. 9 is a diagram illustrating the fetch control unit 508 of FIG. 6. The fetch control unit 508 arbitrates among the various fetch requests, keeps track of the addresses and validity for all outstanding fetches and stores the sequential address after a paired branch. The fetch address table 510 serves the dual purpose of indicating whether the instruction cache is available to receive another fetch request, as well as providing a history of all outstanding instruction fetches. A fetch address field 804 stores the address of the double-bundle which this fetch is accessing. The fetch address table 510 also has for each entry therein a valid field 506 and an on-path field 808 corresponding to a valid bit 506a and an on-path bit 508a, respectively. The valid bit 506a and on-path bit 508a for each entry indicates whether the fetched data will be valid, and whether its operations may be searched for paired branches, respectively. This valid bit 506a determines the validity of data arriving from the instruction cache. It is initially set, but may be deasserted by a mispredicted branch or by a pending PBR operation after a paired branch is found. The on-path bit 508a is initially reset, and is only set if it contains operations along the path prior to a paired branch.

The fetch control unit 508 also contains the next fetch register 511. The next fetch register 511 includes a valid field 810, a fetch address field 812, and a priority field 814. The fetch address field 812 and priority field 814 respectively store the address and priority of the next instruction to be fetched when the instruction cache becomes available. The valid field 810 indicates whether the entry corresponds to an actual fetch being performed in the instruction cache. The priority field 814 contains three bits which indicate the priority level of the fetch request, as described above. The setting of one of the three bits corresponds to one of the following request types: PBR operation requests; mispredicted branch requests; and exception/reset requests. When no bits are set, a sequential fetch request is indicated.

The input to the next fetch register 511 is provided via a 4:1 multiplexer 816, which multiplexes the PBR table target address, the exception/reset request address, the branch sequential address, and the output of an incremental counter 816. The incremental counter 816 generates the next sequential address from which the next fetch is to begin.

The fetch control unit 508 also contains the branch sequential table 512, which is a queue that stores the addresses (double-bundle address 802a and Shift Amount 803a) of the next sequential package after each paired branch. The double-bundle address 802a and shift amount 803a are stored in a sequential address field 802 and a shift amount field 803, respectively. If a paired branch is mispredicted, it must return to its sequential branch target, which is available here. Because a sequential branch target need not be at the beginning of a double-bundle, the shift amount (described below), which indicates the beginning of the package in the double-bundle, is also contained in the branch sequential table 512. The number of entries in the branch sequential table 512 should equal the number of possible pending PBR operations (the size of the PBR Pending Table).

A description of the paired branch found circuit 516 of FIG. 6 follows. It is necessary to search the instruction cache, instruction buffers 501–506, and pipeline for the paired branch corresponding to a pending PBR operation. For the instruction cache 518, the fetch address table 510 keeps an ordered listing of the outstanding fetches currently being performed. For the instruction buffers 501–506, each instruction buffer has its own address field. In the pipeline, the pipeline address table 516 (or similar hardware that provides the addresses and validity of packages in the pipeline) maintains the addresses for packages in the pipeline. However, it is to be appreciated that for in-order processors, the pipeline address table 516 is unnecessary if scheduling ensures that the paired branch is not in the execution pipeline when the PBR operation executes.

The paired branch found circuit 516 compares the last few address bits of the paired branch corresponding to the first pending PBR operation (whose found bit 706a is not set) against each of these addresses. If the addresses match, and the on-path bit for that operation or package is not set, then the paired branch is found. The paired branch found circuit 516 communicates this finding to the fetch control unit 508, instruction buffers 501–506, and pipeline, invalidating all sequential operations after the branch and setting the on-path bit for all operations prior to and including the paired branch. Additionally, a request is sent for fetching the expected branch target address, whose address is provided by the PBR pending table 514.

Figure 10:
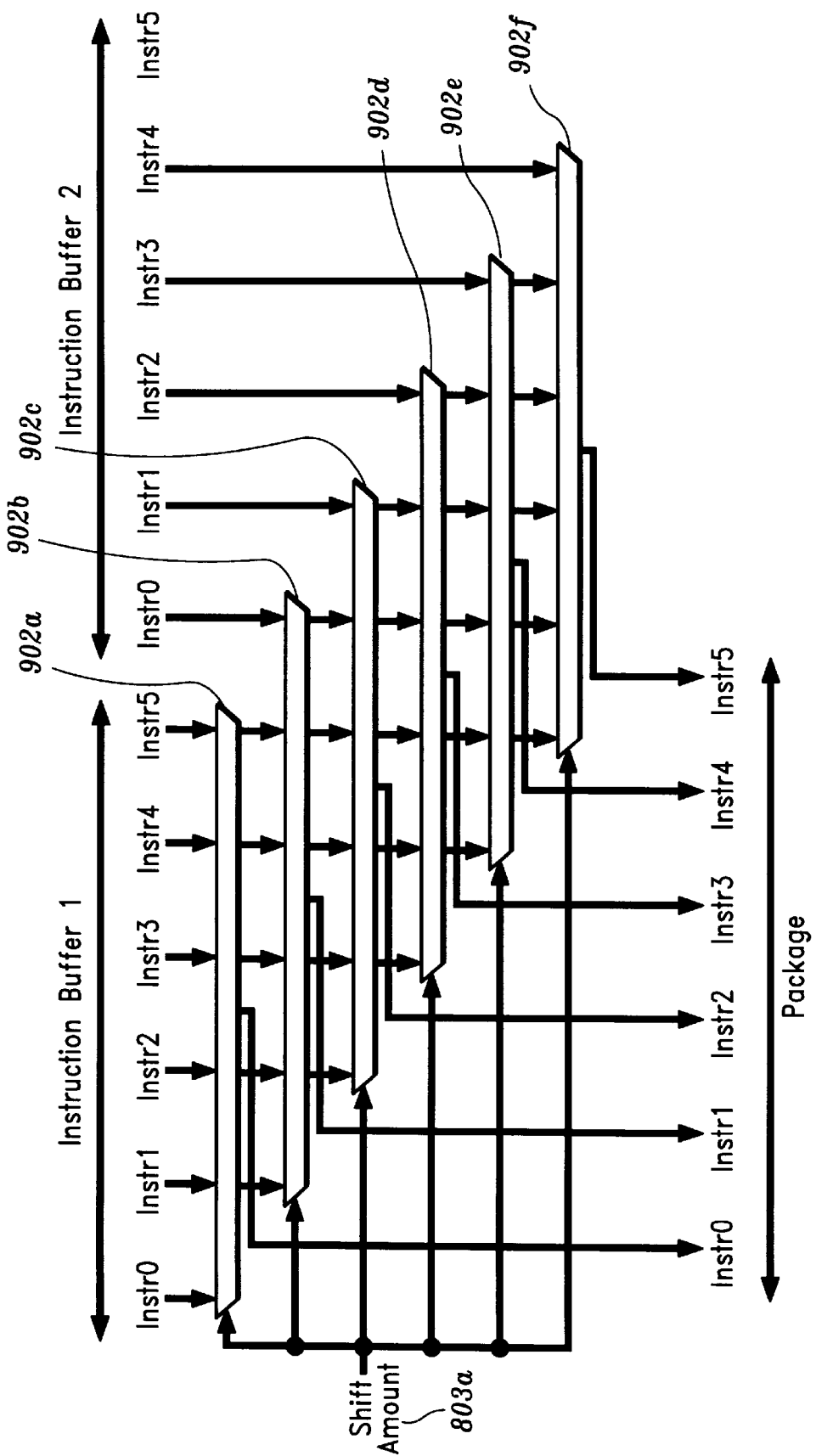
FIG. 10 is a diagram illustrating package selection according to an embodiment of the present invention.

FIG. 10 is a diagram illustrating package selection according to an embodiment of the present invention. Because the EPIC architecture does not provide unique addresses for each operation, it is necessary to maintain a pointer for extracting packages from the double-bundles. The pointer, referred to as shift amount 803a, points to the first operation in the package currently being extracted. The shift amount 803a is sent to six multiplexers 902a–902f which select the next six operations in the first two double-bundles. The stop bits of these six instructions are then evaluated to determine which instructions actually belong to the package. All instructions up to and including the instruction with the first asserted stop bit belong to the package. The shift amount 803a is then adjusted to point to the next operation after the last instruction in this package. In the event that the first operation of the next package is in the second instruction buffer, not the first, an Advance signal is asserted which advances the entire instruction buffer queue.

A brief summary of the present invention follows.

When a PBR operation executes, the PBR operation is written into the first empty spot in the PBR pending table 514, setting the pending bit 708a, resetting the fetched bit 707a, and resetting the found bit 706a corresponding to the pending field 708, fetched field 707, and found field 706, respectively. Then it sends the (last few bits of the) address of its paired branch to the paired branch found circuit 516, which searches the pipeline (via the pipeline address table 516), instruction buffers (via the instruction buffer contains paired branch circuit 610 in each buffer), and instruction cache 518 (via the fetch address table 510). In one embodiment of the present invention, the pipeline address table 516 closely resembles the fetch address table 510, with the exception that the contents of the instructions in each pipeline stage may also be included in the table as well. Also, for this particular implementation, defining the addresses of the instructions in each package (one package per pipeline stage) would require the following: (a) the address of the double-bundle in which the package starts; (b) the offset of the first instruction of the package in that double-bundle; and (c) an instruction mask indicating which of the six instructions in the package are valid (i.e., actually part of that package).

Once the paired branch is found, all sequential operations following the branch are invalidated, all operations prior to and including the branch have their on-path bits set, and a fetch request for the expected branch target is sent to the fetch control unit 508. The fetch control unit 508 writes the address of the expected branch target into the next fetch register 511, and the instruction cache 518 begins fetching it, assuming no higher priority fetch requests are pending. When the instruction data is returned by the instruction cache 518, the paired branch and expected branch target flow through the instruction buffers 501–506 until the paired branch is decoded during Package Selection and clears the pending PBR operation from the PBR pending table 514.

For mispredicted branches, the process is similar, though all entries in the instruction cache 518, instruction buffers 501–506, and pipeline are invalidated. The next fetch register 511 is then set with the actual branch target. For branches that were initially predicted not taken, the correct branch target address is provided in the branch operation. Otherwise, for branches that were initially predicted taken, the sequential branch target address is provided by the branch sequential table 512.

In sum, the present invention advantageously allows the predicted branch target of a branch instruction to be fetched immediately after fetching the branch instruction. Moreover, unlike existing static branch prediction methods, the contents of the branch operation are not required prior to fetching the predicted branch target.

It is to be appreciated that the present invention may be used in any computer processing system having instruction fetch decoupled from the execution pipeline. Moreover, it is to be further appreciated that the present invention is not dependent on any instruction grouping or packing methodologies employed in such systems and, thus, may be readily modified by one skilled in the art for use therein irrespective of instruction grouping or packing.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for prefetching targets of branch instructions in a computer processing system having instruction fetch decoupled from an execution pipeline, the method comprising the steps of:

generating a prepare-to-branch (PBR) operation comprising address bits corresponding to a branch paired thereto and address bits corresponding to an expected target of the branch;

scheduling execution of the PBR operation prior to execution of the paired branch to enforce a desired latency therebetween;

determining whether the paired branch is available using the address bits of the PBR operation corresponding to the paired branch, upon execution of the PBR operation; and fetching the expected branch target using the address bits of the PBR operation corresponding to the expected branch target, when the paired branch is available.

2. The method according to claim 1, wherein the address bits of the PBR operation corresponding to the paired branch comprise a predetermined number of bits of the paired branch.

3. The method according to claim 2, wherein the address bits of the PBR operation corresponding to the paired branch comprise n least significant bits, and said scheduling step comprises the step of defining a scheduling window of $2^n$ operations in which the paired branch may be uniquely identified.

4. The method according to claim 1, wherein the address bits of the PBR operation corresponding to the paired branch comprise an address of a group of instructions and an identifier for identifying a location of the paired branch within the group of instructions.

5. The method according to claim 4, wherein the group of instructions comprise only one branch instruction.

6. The method according to claim 1, wherein the execution of the PBR operation is scheduled $e+w+f+d-1$ cycles prior to the execution of the paired branch, wherein e is a number of execute stages for the PBR operation, w is a number of cycles corresponding to a wire delay, f is a number of instruction fetch stages, and d is a number of decode and register fetch stages.

7. The method according to claim 1, wherein said determining step comprises the step of comparing the address bits of the PBR operation corresponding to the paired branch against address bits of other instructions.

8. The method according to claim 1, wherein said determining step comprises the step of checking the validity of the other instructions.

9. The method according to claim 1, wherein the paired branch is available when the paired branch is one of in an execution pipeline, in an instruction buffer, and being fetched by an instruction cache.

10. The method according to claim 1, further comprising the step of invalidating sequential operations immediately following the paired branch, when the paired branch is available.

11. The method according to claim 1, wherein said computer processing system has capabilities for issuing multiple instructions per cycle.

12. The method according to claim 1, further comprising the step of indicating whether the PBR operation is pending.

13. The method according to claim 1, further comprising the step of terminating the PBR operation and commencing a next PBR operation, upon decoding the paired branch.

14. The method according to claim 1, further comprising the steps of:

decoding the paired branch; and invalidating all operations following the paired branch and fetching a correct target of the paired branch, when a misprediction is detected.

15. The method according to claim 14, wherein said step of fetching the correct target comprises the step of fetching an instruction immediately following the paired branch, when the paired branch is mispredicted taken.

16. The method according to claim 14, wherein said step of fetching the correct target comprises the step of fetching an instruction corresponding to a target address specified in the paired branch, when the paired branch is mispredicted not taken.

17. An apparatus for prefetching targets of branch instructions in a computer processing system having instruction fetch decoupled from an execution pipeline, comprising:

means for generating a prepare-to-branch (PBR) operation comprising address bits corresponding to a branch paired thereto and address bits corresponding to an expected target of the branch;

means for scheduling execution of the PBR operation prior to execution of the paired branch to enforce a desired latency therebetween;

means for determining whether the paired branch is available using the address bits of the PBR operation corresponding to the paired branch, upon execution of the PBR operation; and means for fetching the expected branch target using the address bits of the PBR operation corresponding to the expected branch target, when the paired branch is available.

18. The apparatus according to claim 17, wherein the address bits of the PBR operation corresponding to the paired branch comprise a predetermined number of bits of the paired branch.

19. The apparatus according to claim 18, wherein the address bits of the PBR operation corresponding to the paired branch comprise n least significant bits, and said scheduling step comprises the step of defining a scheduling window of $2^n$ operations in which the paired branch may be uniquely identified.

20. The apparatus according to claim 17, wherein the address bits of the PBR operation corresponding to the paired branch comprise an address of a group of instructions and an identifier for identifying a location of the paired branch within the group of instructions.

21. The apparatus according to claim 20, wherein the group of instructions comprise only one branch instruction.

22. The apparatus according to claim 17, wherein said means for scheduling schedules the execution of the PBR operation e+w+f+d−1 cycles prior to the execution of the paired branch, e is a number of execute stages for the PBR operation, w is a number of cycles corresponding to a wire delay, f is a number of instruction fetch stages, and d is a number of decode and register fetch stages.

23. The apparatus according to claim 17, wherein said determining means comprises means for comparing the address bits of the PBR operation corresponding to the paired branch against address bits of other instructions.

24. The apparatus according to claim 17, wherein said determining means comprises means for checking the validity of the other instructions.

25. The apparatus according to claim 17, wherein the paired branch is available when the paired branch is one of in an execution pipeline, in an instruction buffer, and being fetched by an instruction cache.

26. The apparatus according to claim 17, further comprising means for invalidating sequential operations immediately following the paired branch, when the paired branch is available.

27. The apparatus according to claim 17, wherein said computer processing system has capabilities for issuing multiple instructions per cycle.

28. The apparatus according to claim 17, further comprising means for indicating whether the PBR operation is pending.

29. The apparatus according to claim 17, further comprising means for terminating the PBR operation and commencing a next PBR operation, upon decoding the paired branch.

30. The apparatus according to claim 17, further comprising:

means for decoding the paired branch; and means for invalidating all operations following the paired branch and means for fetching a correct target of the paired branch, when a misprediction is detected.

31. The apparatus according to claim 30, wherein said means for fetching the correct target comprises means for fetching an instruction immediately following the paired branch, when the paired branch is mispredicted taken.

32. The apparatus according to claim 30, wherein said means for fetching the correct target comprises means for fetching an instruction corresponding to a target address specified in the paired branch, when the paired branch is mispredicted not taken.

33. An apparatus for prefetching targets of branch instructions in a computer processing system having instruction fetch decoupled from an execution pipeline, comprising:

means for generating a prepare-to-branch (PBR) operation comprising address bits corresponding to a branch paired thereto and address bits corresponding to an expected target of the branch, the address bits corresponding to the paired branch indicating the location of the paired branch in a group of instructions;

means for scheduling execution of the PBR operation prior to execution of the paired branch to enforce a desired latency therebetween;

means for determining whether the paired branch is available using the address bits of the PBR operation corresponding to the paired branch, upon execution of the PBR operation;

means for fetching the expected branch target using the address bits of the PBR operation corresponding to the expected branch target, when the paired branch is available;

means for extracting the paired branch from the group of instructions;

means for decoding the paired branch; and means for invalidating all operations following the paired branch and fetching a correct target of the paired branch, when a misprediction is detected.

34. The apparatus according to claim 33, wherein the address bits of the PBR operation corresponding to the paired branch comprise an address of the group of instructions and an offset of the paired branch within the group of instructions.

35. The apparatus according to claim 33, wherein any two consecutive instructions in the group of instructions are defined as parallel using a parallel indicating bit therebetween.

* * * * *